DRILLING MUD

Paul W. Fischer, Whittier, Calif., assignor to Union Oil Company of California, Los Angeles, Calif., a corporation of California
No Drawing. Filed Jan. 13, 1961, Ser. No. 82,411
11 Claims. (Cl. 252—8.5)

This invention relates to aqueous base drilling fluids and in particular relates to aqueous base drilling fluids which do not readily hydrate water swellable formations.

In the rotary drilling of subterranean oil wells, a drilling fluid is circulated down the drill string and up the annulus between the well bore and drill pipe. As this fluid passes out the lower end of the drill string it cools and lubricates the drill bit, removes cuttings therefrom, and carries them to the earth's surface. These cuttings are removed from the fluid at the surface and the fluid is treated and recirculated. During the drilling some of the drilling fluid seeps into the formation, depositing its suspended solids on the well bore wall in the form of a mud cake which seals the wall.

In some localities, particularly in the Gulf Coast area, formations are frequently encountered which contain easily hydratable clays and shales which swell and disintegrate upon contact with water. This is extremely troublesome because when contacted with water from the drilling fluid, the walls of the well bore often collapse and cave into the bore hole resulting in cavities and enlargements in the well bore which interfere with subsequent operations. Often the collapse of the shale causes the drill string to stick and sometimes makes further drilling impossible.

It has been suggested that various materials, such as sodium chloride, gypsum, lime, calcium chloride, etc., be incorporated in the drilling fluid to eliminate this difficulty, but while these materials are satisfactory in many instances, they are not entirely effective with respect to very readily hydratable formations such as are encountered in the Gulf Coast, Venezuela, Puerto Rico, etc.

I have found that the hydration of swellable clays, heaving shale, etc., can be greatly reduced by adding to the drilling fluid a tetra(hydroxyalkyl)alkylene diamine dispersing agent derived from alkylene diamines by the addition of four hydroxyalkyl groups to the two amino nitrogen atoms of said diamine. These materials, hereinafter described in detail, are an art recognized class of chemicals which are obtained by reaction of the appropriate alkylene oxides with an alkylene diamine.

Referring more particularly to the aqueous drilling fluids to which the invention applies, any of the commonly employed aqueous and water external emulsion base drilling fluids can be used. Conventionally, such fluids comprise fresh or salt water, clay, one or more fluid loss agents, and optionally, weighting materials and miscellaneous additives such as thinning agents, bactericides, etc. The water external emulsion base drilling fluids also contain between about 5 and 80 percent of a hydrocarbon oil dispersed in the water. The hydrocarbon oil can be a crude petroleum, a distillate, a residuum or a blend of virgin and cracked stocks. Usually such oil will have a gravity between about 12° and about 40° API and a viscosity between 30 SUS at 100° F. and 110 SSF at 122° F. Various oil-in-water emulsifiers can be employed to disperse the oil such as the rosin derivatives, e.g., Dressinate 90; polyalkylene polyamine emulsifiers; alkali metal soaps of fatty acids, etc. The selection and formulation of the oil and the oil-in-water emulsifier based on their chemical and physical properties is well understood by those skilled in the art.

Between about 10 to 250 pounds of clay per barrel of drilling fluid is employed to impart viscosity and thixotropicity to the water so that the cuttings can be suspended in the fluid while in the well bore, yet be separated from the fluid at the earth's surface. Various clays can be employed for this, e.g., local clay or commercially available clays such as bentonite, illites, beidellite, attapulgite, etc.

To prevent excessive water seepage and loss to the formation which would thereby render the drilling fluid unsuitable, between about 0.1 to 10 pounds of a fluid loss additive per barrel of drilling fluid is employed. The most common of such additives are sodium carboxymethyl cellulose, hydrolyzed polyacrylonitrile and starch. Other materials, such as the natural gums, e.g., arabic, tragacanth, karaya, locust bean, Egyptian gum, etc., can also be used.

Since densities greater than the normal aqueous clay suspension, e.g., densities greater than about 20 pounds per gallon, are sometimes needed, particularly when drilling relatively deep holes or where high formation pressures are encountered, it is common practice to employ weighting agents in amounts between about 10 to 1000 pounds per barrel of drilling fluid and sufficient to impart the desired density to the composition. Typical of the weighting agents which are used to obtain such densities are barites, iron oxide, calcium carbonate, celestite, tripoli, etc.

Because the clay often renders the water too viscous, or because the drilling fluid becomes excessively viscous upon use, various thinning agents in amounts between about 0.1 to 15 pounds per barrel are frequently employed to reduce its viscosity. Among such agents are tannin extracts such as chestnut extract, plant tannin, quebracho extract, etc.; lignins or humic acids; alkali and alkaline-earth lignosulfonates; and molecularly dehydrated phosphates. When the drilling fluids contain calcium salts, e.g., gypsum, as anti-hydration agents, the molecularly dehydrated phosphates are not preferred as thinning agents because of their tendency to precipitate calcium phosphates.

When the fluid comprises an organic material such as starch or humus, bactericides are frequently employed in minor amounts to prevent fermentation. Typical of such bactericides are: paraformaldehyde, lime and salt in high concentrations and limited amounts of quaternary salts.

As previously mentioned, salts of the alkali and alkaline-earth metals have been employed in amounts between about 1 and about 20 pounds per barrel of drilling fluid to reduce the hydration of clays and shales which are encountered during the drilling operation. Typical of such are sodium chloride, calcium chloride, gypsum, calcium acetate, etc. These materials can also be employed in the drilling fluids of my invention to increase their hydration inhibition. The tetra(hydroxyalkyl)alkylene diamine wetting agents when employed in accordance with my invention, however, are highly effective as the sole hydration inhibitor.

The wetting agents which I have found to be effective in substantially eliminating hydration of clays and heaving shales by the aforementioned drilling fluids are non-ionic agents having the following general formula:

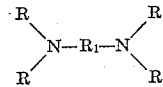

wherein $R_1$ is an alkylene radical having 2 to 5 carbon atoms; R is hydrogen or a monohydroxyalkyl radical having 2 to 5 carbon atoms; the total carbon atoms of the $R_1$ and all the R groups is between about 10 and about 20; and no more than two of the R groups are hydrogen. These agents I have found to be effective in preventing hydration of hydratable clays, heaving shales, etc., in concentrations between about 2 and about 10 pounds per barrel, preferably between about 4 and about 7 pounds per barrel.

These materials are derived from polyalkylene diamines such as ethylene diamine, propylene diamine, trimethylene diamine, butylene diamine, tetramethylene diamine, pentylene diamine and pentamethylene diamine, by reaction with the appropriate alkylene oxide, i.e., ethylene oxide, propylene oxide, butylene oxide, pentylene oxide. The preparation of these agents from commercially available alkylene diamines and alkylene oxides is well known in the art, e.g., see U.S. Patents 2,697,118 and 2,884,459.

In general, the agents are prepared by mixing the alkylene oxide with the alkylene diamine in stoichiometric amounts to add the desired molecular weight of the alkylene oxide per molecular weight of the diamine. To attain dissimilar hydroxylated alkyl groups on the amino nitrogens, the proper proportions of the desired alkylene oxides can be introduced together or sequentially to the alkylene diamine, e.g., three molecular weights of ethylene oxide and one molecular weight of propylene oxide per molecular weight of alkylene diamine can be introduced into the reactor to produce a monohydroxypropyl tri(hydroxyethyl)alkylene diamine.

The reaction conditions can be conducted at atmospheric or elevated pressures and at temperatures between about 50 and 150° C. It has been observed that the presence of water or an alcohol catalyzes the reaction and therefore it is preferred that at least about 1.0 percent of these materials be present. It is important that alkaline materials such as sodium or potassium hydroxide be absent from the reactants or ether polymerization of the alkylene oxides will occur, forming polyoxyalkylene groups on the amino nitrogen rather than the desired monomeric hydroxyalkyl groups.

The preparation of a material which is commercially available as "Visco" from the Visco Products Company is set forth in Examples I and II of aforecited U.S. Patent 2,884,459. Briefly this preparation comprises the addition of one molecular weight of ethylene oxide to one molecular weight of ethylene diamine at a pressure of about 10 pounds per square inch gage and temperatures between about 60° to 100° centigrade. The system is digested for one to two hours and thereafter three molecular weights of propylene oxide are introduced. After completion of the reaction, as indicated by a constant pressure, the product is removed and is substantially pure monohydroxyethyl tri(2-hydroxypropyl)ethylene diamine.

It is, of course, apparent that any of a variety of compounds can be prepared in this manner; however, to provide the proper balance between hydrophobic and hydrophilic groups in the material, it is important that the number of carbon atoms in any of the alkylene groups does not exceed 5 and that the total of the carbon atoms is between about 10 and about 20. Examples of various agents effective in my invention are:

tri(2 - hydroxyamyl)mono(2 - hydroxypropyl)ethylenediamine;
tetra(2-hydroxypropyl)ethylenediamine;
tetra(hydroxyethyl)ethylenediamine;
di(2 - hydroxyamyl)mono(2 - hydroxybutyl)mono(2-hydroxyproyl)propylenediamine;
tri(2 - hydroxypropyl)mono(2 - hydroxybutyl)trimethylenediamine;
di(2-hydroxyamyl)di(2-hydroxypropyl)butylenediamine;
tetra(hydroxyethyl)tetramethylenediamine;
di(2-hydroxyamyl)mono(2-hydroxypropyl)monohydroxyethyl pentylene diamine;
tetra(2-hydroxypropyl)pentamethylene diamine.

EXAMPLE 1

To demonstrate the properties of various water base drilling muds of my invention and the hydration inhibition of their filtrates, the following drilling fluid composition was prepared:

*Base Fluid*

| Ingredient: | Pounds per barrel |
|---|---|
| Ocean water | 312 |
| Native Californian clay (Rodgers Lake) | 88.5 |
| Attapulgite clay | 7.2 |
| Sodium hydroxide | 1.8 |
| Sodium salt of polyacrylic acid (Cypan [1]) | 1.8 |
| Ferrochrome lignosulfonate (Q-Broxin [2]) | 5.5 |

[1] American Cyanamide Company.
[2] Baroid Mud Company.

Commercially available monohydroxyethyl trihydroxypropyl ethylenediamine marketed as "Visco" by the Visco Products Company was added to samples of the base fluid at concentrations of 0, 3, 7 and 10 pounds per barrel. The samples were stirred at 3400 r.p.m. for 5 minutes and then transferred to pressure vessels which were clamped into a rotor in an oven at 400° F. and rotated or tumbled for 16 hours. At the end of this period the samples were withdrawn and tested by a standard API test method for fluid loss, and the fan viscosimeter for viscosity and gel strength. A filtrate was obtained from each sample and tested for hydration inhibition at room temperature by placing a five gram easily hydratable core of Gulf Coast origin into a two hundred milliliter sample of the filtrate. After 4 days, the immersed core was inspected and the percent of its original volume recorded. Since cores placed in water disintegrated completely within this period, the percent of original volume remaining after four days was recorded as the percent hydration inhibition. The following table summaries the results:

TABLE 1

| Concentration of hydration inhibitor [1] | Inhibition (percent) of original | Drilling fluid properties ||||  |
|---|---|---|---|---|---|---|
| | | Fan viscosity, sec. || Fan gel strength [2] || Fluid loss, mil. in 30 min. |
| | | 600 r.p.m. | 300 r.p.m. | Initial | 10 min. | |
| 0 | 0 | 40 | 21 | 4 | 9 | 108 |
| 3 | 75 | 15 | 8 | 2 | 4 | 88 |
| 7 | 90 | 26 | 16 | 3 | 6 | 74 |
| 10 | 90 | 16 | 10 | 2 | 4 | 60 |

[1] Pounds per barrel.   [2] Pounds force per 100 square feet.

In lieu of the monohydroxyethyl tri(2-hydroxypropyl)ethylene diamine, other inhibitors can be employed such as tetra(2-hydroxypropyl)ethylene diamine, tetra(hydroxyethyl)ethylene diamine, tetra(2-hydroxybutyl)tetramethylene diamine and monohydroxyethyl tri(2-hydroxyamyl)propylene diamine.

EXAMPLE 2

To demonstrate the compatibility of the hydroxyalkylated alkylene diamines with fluid loss agents in the drilling fluids of my invention, carboxymethyl cellulose (CMC) and starch were employed in separate samples of the drilling fluid in lieu of the sodium salt of polyacrylic acid (Cypan) used in Example 1. The drilling fluid was treated and tested as in Example 1 and the following results were obtained:

TABLE 2

| Concentration of hydration inhibitor [1] | Inhibition percent of original | Fluid loss additive | | Drilling fluid properties | | | | |
|---|---|---|---|---|---|---|---|---|
| | | Identity | Concentration | Fan velocity, sec. | | Fan gel strength [2] | | Fluid loss ml. in 30 min. |
| | | | | 600 r.p.m. | 300 r.p.m. | Initial | 10 min. | |
| 7 | 90 | Starch | 5 | 19 | 12 | 2 | 9 | 10.2 |
| 3.5 | 75 | CMC | 4 | 26 | 19 | 5 | 8 | 112 |

[1] Pounds per barrel.  [2] Pounds force per 100 square feet.

EXAMPLE 3

A weighted drilling fluid was prepared having the following composition:

Ingredient: Pounds per barrel
- Ocean water _____ 241
- Native Californian clay (Rodgers Lake) ____ 69
- Attapulgite clay _____ 5.5
- Sodium hydroxide _____ 1.4
- Sodium salt of polyacrylic acid (Cypan) ___ 1.4
- Ferrochrome lignosulfonate (Q-Broxin) ____ 4.2
- Barites _____ 345
- Visco (monohydroxyethyl trihydroxypropyl ethylenediamine) _____ 7

The drilling fluid was treated and tested as in Example 1 and the following results obtained:

TABLE 3

| Shale Inhibition (percent of original) | Drilling fluid properties | | | | |
|---|---|---|---|---|---|
| | Fan visc., sec. | | Fan gel strength [1] | | Fluid loss ml. in 30 min. |
| | 600 r.p.m. | 300 r.p.m. | Initial | 10 min. | |
| 90 | 76 | 50 | 12 | 32 | 67 |

[1] Pounds force per 100 square feet.

EXAMPLE 4

A drilling fluid was prepared having the following composition:

Ingredient: Pounds per barrel
- Fresh water _____ 318
- Native Californian clay (Rodgers Lake) ___ 68
- Bentonite clay _____ 7.3
- Caustic _____ 0.5
- Gypsum _____ 9.1
- Carboxymethyl cellulose (CMC) _____ 1.8
- Ferrochrome lignosulfonate (Q-Broxin) ____ 3.6

In accordance with my invention, Visco was added to samples of this drilling fluid at concentrations of 1, 3, 5 and 7 pounds per barrel. The drilling fluid samples were then treated and tested as described in Example 1 and the following results obtained:

TABLE 4

| Concentration of inhibitor [1] | Inhibition, percent of original | Drilling fluid properties | | | | |
|---|---|---|---|---|---|---|
| | | Fan viscosity, sec. | | Fan gel strength [2] | | Fluid loss ml. in 30 min. |
| | | 300 r.p.m. | 300 r.p.m. | Initial | 10 min. | |
| 0 | 0 | 20 | 13 | 5 | 12 | 37 |
| 1 | 0 | 23 | 16 | 6 | 14 | 36 |
| 3 | 0 | 27 | 18 | 4 | 18 | 37 |
| 5 | 75 | 24 | 15 | 3 | 16 | 47 |
| 7 | 90 | 27 | 15 | 4 | 18 | 57 |

[1] Pounds per barrel.  [2] Pounds force per 100 square feet.

To attain a high density drilling fluid weighting materials such as barites in amounts up to 500 pounds per barrel can be added to this drilling fluid.

The preceding examples are presented solely to illustrate compositions of my invention and to set forth the properties which can be obtained by these fluids. They are not to be construed as unduly limiting of my invention which comprises the compositions of materials or their obvious equivalents as set forth in the following claims.

I claim:

1. A drilling fluid selected from the class consisting of water base and oil-in-water emulsion base drilling fluids, said drilling fluid comprising an aqueous suspension of a clay and between about 2 and about 10 pounds of a clay hydration inhibitor per barrel of fluid, said inhibitor comprising a hydroxyalkylated alkylene diamine having the following general formula:

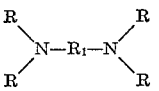

wherein $R_1$ is an alkylene radical containing 2 to 5 carbon atoms; R is selected from the group consisting of hydrogen and a monohydroxyalkyl radical having 2 to 5 carbon atoms; the total of the carbon atoms in said $R_1$ and R groups is between about 10 and about 20; and no more than two of the R groups are hydrogen.

2. The drilling fluid of claim 1 which comprises a suspension of clay in ocean water containing between about 10 and about 250 pounds of clay per barrel of said drilling fluid.

3. The drilling fluid of claim 2 which also contains between about 0.1 and about 15 pounds of a thinning agent per barrel.

4. The drilling fluid of claim 2 which also contains between about 0.1 and about 15 pounds of a fluid loss agent per barrel.

5. The drilling fluid of claim 2 which also contains between about 10 and about 1000 pounds of a weighting agent per barrel.

6. The drilling fluid of claim 1 wherein said alkylene radical is ethylene.

7. The drilling fluid of claim 6 wherein said inhibitor is monohydroxyethyl tri(2-hydroxyproply)ethylene diamine.

8. A drilling fluid selected from the class consisting of water base and oil-in-water emulsion base drilling fluids, said drilling fluid comprising fresh water, between about 10 and about 500 pounds of clay per barrel of said fluid, between about 1 and about 20 pounds of gypsum per barrel of said fluid, and between about 2 and about 10 pounds of a clay hydration inhibiting agent per barrel of said fluid, said agent comprising a hydroxylated alkylene diamine having the following general formula:

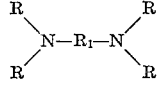

wherein $R_1$ is an alkylene radical containing 2 to 5 carbon atoms; R is selected from the group consisting of hydrogen and a monohydroxyalkyl radical having 2 to 5 carbon atoms; the total of the carbon atoms in said $R_1$ and R groups is between about 10 and about 20; and no more than two of the R groups are hydrogen.

9. The drilling fluid of claim 8 which also contains between about 0.1 and about 15 pounds of a thinning agent per barrel.

10. The drilling fluid of claim 8 which also contains between about 0.1 and about 15 pounds of a fluid loss agent per barrel.

11. The drilling fluid of claim 8 which also contains between about 10 and about 1000 pounds of a weighting agent per barrel.

References Cited in the file of this patent

UNITED STATES PATENTS

| 2,697,118 | Lundsted | Dec. 14, 1954 |
| 2,873,251 | Jones | Feb. 10, 1959 |
| 2,884,459 | Kirkpatrick | Apr. 28, 1959 |
| 2,935,473 | King et al. | May 3, 1960 |
| 2,994,660 | Reddie et al. | Aug. 1, 1961 |

FOREIGN PATENTS

| 576,739 | Canada | May 26, 1939 |